US012119587B2

(12) United States Patent
Hohenadl

(10) Patent No.: US 12,119,587 B2
(45) Date of Patent: Oct. 15, 2024

(54) ELECTRICAL PLUG CONNECTOR, ELECTRICAL PLUG CONNECTION AND SECURING ELEMENT FOR AN ELECTRICAL PLUG CONNECTOR

(71) Applicant: Rosenberger Hochfrequenztechnik Gmbh & Co. KG, Fridolfing (DE)

(72) Inventor: Florian Hohenadl, Taching am See (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 367 days.

(21) Appl. No.: 17/633,740

(22) PCT Filed: Aug. 5, 2020

(86) PCT No.: PCT/EP2020/072061
§ 371 (c)(1),
(2) Date: Feb. 8, 2022

(87) PCT Pub. No.: WO2021/028294
PCT Pub. Date: Feb. 18, 2021

(65) Prior Publication Data

US 2022/0329008 A1 Oct. 13, 2022

(30) Foreign Application Priority Data

Aug. 9, 2019 (EP) .................................... 19190945

(51) Int. Cl.
*H01R 13/62* (2006.01)
*H01R 13/627* (2006.01)
(Continued)

(52) U.S. Cl.
CPC ....... *H01R 13/6272* (2013.01); *H01R 13/631* (2013.01); *H01R 13/639* (2013.01)

(58) Field of Classification Search
None
See application file for complete search history.

(56) References Cited

U.S. PATENT DOCUMENTS 6,491,542 B1 12/2002 Zerebilov
9,929,509 B1 3/2018 Penn
(Continued)

FOREIGN PATENT DOCUMENTS

CN 101437427 5/2009
CN 103181033 6/2013
(Continued)

OTHER PUBLICATIONS

Office Action issued by the Chinese Patent Office dated Jul. 20, 2023.

(Continued)

*Primary Examiner* — Ross N Gushi
(74) *Attorney, Agent, or Firm* — Randall Danskin P.S.

(57) ABSTRACT

An electrical plug connector, comprising a plug connector housing, a locking securement means for locking the electrical plug connector with a corresponding electrical mating plug connector, and a securing element that is displaceable between a pre-latching position and a securing position. The securing element blocks the locking securement means in the securing position to prevent unlocking of the mating plug connector. In a first variant, the electrical plug connector housing forms a lead-in along which the securing element can be displaced into the pre-latching position. In a second variant, the securing element is in the plug connector housing and when the mating plug connector being plugged in, the securing element is mechanically loaded, and a plug connector housing guide guides displacement of the secur-
(Continued)

ing element from the pre-securing position into the securing position and the mechanical load is relieved in the displacement.

17 Claims, 7 Drawing Sheets

(51) Int. Cl.
*H01R 13/631* (2006.01)
*H01R 13/639* (2006.01)

(56) References Cited

U.S. PATENT DOCUMENTS

| | | | | |
|---|---|---|---|---|
| 10,283,904 | B2 | 5/2019 | Amemiya | |
| 2017/0062980 | A1 | 3/2017 | Wimmer | |
| 2017/0373435 | A1* | 12/2017 | Denz .................. | H01R 13/6272 |
| 2019/0044278 | A1 | 2/2019 | Amemiya | |

FOREIGN PATENT DOCUMENTS

| | | | |
|---|---|---|---|
| CN | 203747155 | | 7/2014 |
| CN | 107408780 | | 11/2017 |
| WO | 2010032088 | A1 | 3/2010 |
| WO | 2018072940 | | 4/2018 |

OTHER PUBLICATIONS

European Search Report dated Feb. 17, 2020.
Internation Search Report dated Oct. 9, 2020.

* cited by examiner

ELECTRICAL PLUG CONNECTOR, ELECTRICAL PLUG CONNECTION AND SECURING ELEMENT FOR AN ELECTRICAL PLUG CONNECTOR

CROSS-REFERENCE TO RELATED APPLICATIONS

This US National Stage Non-Provisional Patent Application claims priority to earlier filed PCT Patent Application No. PCT/EP2020/072061 which was filed on 5 Aug. 2020 and which was published as WO 2021/028294 A1 on 18 Feb. 2021, and also claims priority to earlier filed European Patent Application No. 19 190 945.6 which was filed on 9 Aug. 2019. The entire contents of the aforementioned earlier filed PCT Patent Application and the aforementioned earlier filed European Patent Application are both expressly and fully incorporated herein by this reference.

Pursuant to USPTO rules, this priority claim to earlier filed PCT Patent Application No. PCT/EP2020/072061 which was filed on 5 Aug. 2020 and which was published as WO 2021/028294 A1 on 18 Feb. 2021, and to earlier filed European Patent Application No. 19 190 945.6 which was filed on 9 Aug. 2019, is also included in the Application Data Sheet (ADS) filed herewith.

TECHNICAL FIELD

The invention relates to an electrical plug connector, having a plug connector housing, a locking securement means for locking the plug connector to a corresponding electrical mating plug connector, and a securing element displaceable between a pre-latching position and a securing position.

The invention further relates to a securing element for an electrical plug connector.

The invention additionally relates to an electrical plug connection, having an electrical plug connector and an electrical mating plug connector corresponding to the plug connector.

BACKGROUND

An electrical plug connector or an electrical mating plug connector can be a plug, a panel plug, a socket, a coupling or an adapter. The term "plug connector" or "mating plug connector" used within the scope of the invention is representative for all variants.

Plug connectors for the automotive industry in particular are subject to high demands in terms of their robustness and the reliability of the plug connections. For example, a plug connection must be able to withstand high loads, such as mechanical loads, and must remain closed in a defined manner. It must be ensured that the electrical connection is not disconnected unintentionally, for example while a vehicle is in operation. Furthermore, the plug connectors must also ensure flawless transmission of electrical power, electrical signals and/or data in contaminated, damp and/or chemically aggressive environments.

Sometimes, a so-called insertion acknowledgement must also be provided for an assembler of the plug connection. This can be done, for example, by ensuring that a mating plug connector can only be plugged into plug connector if the plug connection has been correctly assembled beforehand.

Ensuring safety is a priority, especially for autonomous vehicle operation and for assistance systems.

In particular, the aging of a plug connection can lead, potentially, to a safety-critical problem. As a rule, electrical plug connectors, especially for the automotive sector, have securing elements that prevent unintentional unlocking of a plug connection and thus separation of the mating plug connector from the plug connector. For this purpose, the securing elements are usually subjected to mechanical and thermal stress over a relatively long period of time, which can further accelerate their aging. The securing elements can eventually become brittle and break, as a result of which they can no longer fulfill their intended function. The problem exists in particular in the case of situation of a permanent mechanical load on a securing element made of plastic.

Securing elements that nevertheless guarantee a sufficient service life are complex and expensive to manufacture. Alternative securing elements of which the mechanical load is reduced during operation, on the other hand, require a comparatively large installation space in the plug connector and, in addition, are also complex to assemble.

In view of the known prior art, the object of the present invention is to provide an electrical plug connector having an improved securing element, in particular to increase the ease of assembly and the service life of the plug connector.

The present invention is also directed to providing an improved securing element for an electrical plug connector.

Lastly, it is also the object of the invention to provide an electrical plug connection formed of a mating plug connector and a plug connector having an improved securing element, in particular to increase the ease of assembly and the service life of the connection.

The features disclosed and described herein, including the Claims and the Figures relate to advantageous embodiments and variants of the invention.

An electrical plug connector is provided, having a plug connector housing, a locking securement means for locking the plug connector to a corresponding electrical mating plug connector, and a securing element displaceable between a pre-latching position and a securing position. The securing element blocks the locking securement means in the securing position to prevent unlocking of the mating plug connector.

When the electrical plug connector is locked with the corresponding electrical mating plug connector, the plug connector and the mating plug connector are preferably electrically and mechanically functionally connected for the intended use for power and/or signal transmission.

The locking securement means can preferably form a so-called primary latching of the plug connection with a corresponding detent element of the mating plug connector, for example a detent hook of the mating plug connector.

The securing element can ensure that the electrical plug connector and the electrical mating plug connector are held securely in their mated state, since movement of the locking securement means to unlock the mating plug connector is blocked by the securing element. This principle is sometimes also referred to as "housing locking" or "connector position assurance" (CPA).

The locking securement means can have a detent portion for latching with the mating plug connector, in particular with a detent hook of the mating plug connector. The detent portion can preferably be arranged in the region of a front end of the locking securement means facing the mating plug connector. For example, in the insertion direction of the mating plug connector, a recess can be provided in the locking securement means immediately behind the detent portion, into which recess the detent hook of the mating plug connector can penetrate for locking with the plug connector. The detent portion can thus be gripped from behind by the mating plug connector or by its detent hook.

The locking securement means can preferably be designed as a detent rocker. The detent rocker can have the detent portion for latching with the mating plug connector or with its detent element. For example, the detent rocker can have a recess behind the detent portion in the region of a front end of the detent rocker facing the mating plug connector. The detent hook of the mating plug connector can thus engage in the recess of the detent rocker and can thus lock the plug connection. The detent rocker can have an actuation portion, wherein the detent rocker can be pivoted about an axis of rotation formed between the detent portion and the actuation portion by actuation of the actuation portion, for example by a user of the plug connection, in order to unlock the plug connection by "lifting" the detent portion—at least provided that the securing element is not in its securing position. Preferably, the locking securement means can be designed as a detent rocker of a FAKRA plug connector.

According to a first variant of the invention, the plug connector housing forms a feed along which the securing element is displaceable from outside the plug connector housing in the direction of a longitudinal axis of the plug connector housing into the pre-latching position.

This "radial" insertion of the securing element in the direction of the longitudinal axis of the plug connector housing, in particular (but not exclusively) in the case of a substantially orthogonal insertion movement, allows the design of the plug connector housing to be advantageously reduced in the longitudinal direction.

Preferably, the feed is designed to move the securing element into the pre-latching position by a linear movement in the direction of the longitudinal axis of the plug connector housing. In principle, however, a curved movement can also be provided.

According to a second variant of the invention, the securing element is positioned in the pre-latching position in the plug connector housing in such a way that the securing element is brought by the insertion of the mating plug connector into a pre-securing position in which the securing element is mechanically tensioned, wherein the plug connector housing forms a guide along which the securing element is displaceable from the pre-securing position into the securing position and in so doing mechanically relaxes, preferably completely mechanically tensions.

Due to the mechanical tensioning of the securing element in the pre-securing position, which represents an intermediate position between the securing position and the pre-latching position, the securing element can—optionally after an intended release by a user—move from the pre-securing position into the securing position while the securing element mechanically relaxes. After removal of the mating plug connector, however, it can also be provided that the securing element—optionally after an intended release by a user—moves from the pre-securing position back to the pre-latching position while the securing element mechanically relaxes.

Thus, due to the mechanical tensioning, the securing element, starting from the pre-securing position, either strives for the securing position or the pre-latching position.

The pre-securing position can be an initially still stable position, whereby the "automatic", elasticity- or spring force-induced movement of the securing element into the securing position or into the pre-latching position can be triggered or controlled by an intervention of the user of the plug-in connection. However, the pre-securing position can also be an unstable position, whereby the "automatic", elasticity- or spring force-induced movement of the securing element into the securing position or back into the pre-latching position takes place immediately after reaching the pre-securing position—depending on whether or not the mating plug connector is plugged into the plug connector.

In the context of the invention, a "pre-latching position", a "pre-securing position" or a "securing position" can mean a position (for example axial and/or radial with respect to the longitudinal axis of the plug connector housing) and/or an orientation (for example a tilting) of the securing element.

Within the scope of the overall inventive concept, the first variant of the invention can be implemented alternatively, or in addition, to the second variant of the invention. The two variants are related to each other in that they can increase the reliability of the plug-in connection while maintaining a simple assembly (in each case individually or in combination). All features, embodiments and refinements described herein can advantageously refer to both variants of the invention.

In an advantageous refinement of the invention, the displacement path for the securing element ends in the securing position in which the securing element is positioned between a detent portion of the locking securement means and an outer wall of the plug connector housing in order to block the locking securement means.

Preferably, in the securing position, the front end of the securing element facing the mating plug connector does not protrude beyond the detent portion of the locking securement means. In the securing position, the front end of the securing element can, for example, be coplanar with the outer housing of the plug connector, wherein the securing element can also be set back in the plug connector housing or can form a recess.

Preferably, the displacement path of the securing element in the plug connector housing between the pre-latching position and the securing position is limited, in particular the axial displacement path along the longitudinal axis of the plug connector housing. Thus, for example, the securing element can preferably no longer be displaced further after reaching the securing position.

In an advantageous embodiment of the invention, it can be the securing element is arranged in the pre-latching position in the plug connector housing in such a way that the securing element is completely mechanically relaxed.

In one embodiment of the invention, the securing element is arranged in the securing position in the plug connector housing in such a way that the securing element is completely mechanically relaxed.

Particularly preferably, the securing element is completely mechanically relaxed in the securing position as well as in the pre-latching position.

In particular, if the securing element is not mechanically braced either in the securing position or in the pre-latching position, the service life of the securing element can be significantly increased, since longer-lasting mechanical loads (when using the mated plug connection or when storing the individual plug connector) can be avoided.

Preferably, the securing element is mechanically tensioned in the pre-securing position.

According to a refinement of the invention, the feed is formed in the plug connector housing in such a way that the securing element is displaceable into the pre-latching position by a movement running substantially orthogonal to the longitudinal axis of the plug connector housing.

Thus, during insertion into the plug connector housing, the securing element preferably performs a radial movement or a lateral movement in the direction of the longitudinal axis of the plug connector housing. The movement can be rectilinear or curvilinear.

However, in addition to an orthogonal, or radial, or lateral directional component of the movement of the securing element during insertion into the plug connector housing, an axial directional component can also be provided. For example, it can be provided that the securing element is displaceable by a movement along a straight line in the direction of the longitudinal axis of the plug connector housing, wherein the straight line with the longitudinal axis includes a feed angle of 1° to 90, preferably 10° to 90°, particularly preferably 20° to 90, very particularly preferably 45° to 90°, further preferably 70° to 90 and even more preferably 80° to 90°.

The securing element can have a front-end portion and a rear end portion opposite the front end portion along the longitudinal axis of the plug connector housing when the securing element is inserted into the plug connector housing.

The securing element can have a securing region at the end facing the mating plug connector or the front-end portion, by means of which securing region the securing element can block the locking securement means.

In an advantageous embodiment of the invention, it can be provided that the displacement path for the securing element ends in the securing position in which the securing region of the securing element is positioned between the detent portion of the locking securement means and the outer wall of the plug connector housing in order to block the locking securement means. Preferably, therefore, the securing region of the securing element in the securing position does not protrude beyond the detent portion of the locking securement means. In the securing position, the securing region of the securing element can, for example, terminate coplanar with the outer housing of the plug connector, wherein the securing region of the securing element can also be recessed or can form a recess in the plug connector housing.

According to a refinement of the invention, the securing element comprises the securing region, a support region and a spring region in-between, wherein the securing region is arranged at the front end portion of the securing element facing the mating plug connector and the support region is arranged at the rear end portion of the securing element opposite the front end portion along the longitudinal axis of the plug connector housing when the securing element is inserted into the plug connector housing.

The spring region can be deformable, or at least partially elastic, in order to introduce mechanical tension into the securing element. The deformability, or elasticity, of the spring region can be selected such that the securing element can bend sufficiently reversibly for its intended use without undergoing (irreversible) plastic deformation.

The spring region can preferably be formed by one or more spring arms extending from the front-end portion, or a middle portion, of the securing element towards the rear end portion. The support region can be formed preferably (but not exclusively) directly at the free ends of the spring arm or spring arms, for example by laterally projecting lugs.

Preferably, two spring arms can be provided to form the spring region, running on opposite sides of the securing element. However, three spring arms or more spring arms, four spring arms or even more spring arms can also be provided.

In a refinement of the invention, it the securing element is positioned in the pre-latching position in the plug connector housing in such a way that insertion of the mating plug connector results in a displacement of the securing region of the securing element running substantially orthogonally to the longitudinal axis, while the securing element is supported by the support region against the plug connector housing, preferably in such a way that the spring region in-between is mechanically tensioned.

By displacing the securing region of the securing element by the mating plug connector while simultaneously supporting the securing element by means of its support region on the plug connector housing, the mating plug connector can cause a lifting, or pivoting, movement of the securing element in its front-end portion, while the distance of the support region to the longitudinal axis of the plug connector housing remains (at least substantially) unchanged.

The optional (but preferred) tensioning of the spring region during the displacement of the securing region can be accomplished, for example, by bending the securing element in the plug connector housing instead of rotating the securing element. To cause the bending and thus introduce the mechanical tension into the securing element, a rotation of the securing element can be mechanically prevented and for this purpose preferably a middle portion between the front-end portion and the rear end portion of the securing element can be held axially and/or radially in the plug connector housing while the mating plug connector displaces the securing element.

Preferably, the pre-securing position differs from the pre-latching position in the plug connector housing only by the orientation of the securing element and by the tensioning of the spring region.

In a refinement of the invention, the securing region of the securing element in the pre-latching position is positioned in a recess in the locking securement means such that the securing region is in a displacement path of a detent hook of the mating plug connector so as to be displaced by the detent hook into the pre-securing position during the insertion of the mating plug connector.

Preferably, the securing region can be positioned in the recess of the locking securement means, which is also engaged from behind by the detent hook of the mating plug connector for locking the plug-in connection.

The fact that the securing region of the securing element is positioned in its pre-latching position in the recess of the locking securement means, for example in the recess of the aforementioned detent rocker, means that the securing region can be “lifted out” of the recess quite specifically (preferably exclusively) with the aid of the detent hook of the mating plug connector. Preferably, the securing element thus cannot otherwise be moved from the pre-latching position into the pre-securing position or into the securing position for securing the primary latching. In accordance with the invention, a “securing prevention function” can be realized in this way.

In an advantageous embodiment of the invention, the securing element in the securing position interlockingly blocks the locking securement means with the securing region.

In particular, interlocking blocking of the locking securement means by the securing element can result in force-free mounting of the securing element in the securing position and, at the same time, can still lead to a secure locking of the plug-in connection.

For example, it can be provided that the securing element in its securing position blocks, by way of frictional engagement, a locking securement means of the electrical plug connector designed as a detent rocker, whereby an unintentional unlocking or actuation of the detent rocker by an object or a user of the plug connection can be prevented. For this purpose, the securing element can, for example, be positively inserted in the securing position between the detent rocker and an outer shell or outer wall of the plug connector housing, whereby the detent rocker can no longer be moved rotationally in the direction of the outer shell and is thus secured.

In a refinement of the invention, the securing element is spaced from the mating plug connector in the securing position.

Preferably, at least the detent hook of the mating plug connector is spaced from the securing element in the securing position of the securing element in order not to permanently mechanically load the securing element.

In principle, the mating plug connector and the securing element can also be in contact (force-free). However, a safety distance can be preferable, particularly for reasons of tolerances in the production of the plug connector, in order to guarantee the force-free condition of the securing element.

In an advantageous refinement of the invention, the securing element has at least one guide pin.

Preferably, two guide pins are provided, wherein the guide pins protrude laterally from the securing element.

The at least one guide pin can be engageable with the feed of the plug connector housing for displacing the securing element into the pre-latching position in order to guide the securing element during the displacement into the pre-latching position.

Preferably, in this case, the feed can be in the form of one or more guide grooves or guide channels. The guide groove or guide channel can preferably extend on an inner face of a side wall of the outer shell or a side wall of the plug connector housing. The side wall of the plug connector housing preferably runs parallel to the longitudinal axis of the plug connector housing, at least in a portion relevant for the securing element. Preferably, two guide grooves are provided which run on opposite inner faces of the side wall of the plug connector housing.

The guide grooves or the guide channels can provide the movement described for the displacement of the securing element from outside the plug connector housing to the pre-latching position. The movement and thus the guide groove(s) can preferably be rectilinear or curvilinear. The guide groove(s) can run in such a way that the movement of the securing element during insertion into the plug connector housing also has an axial direction component in addition to an orthogonal or radial or lateral direction component, as already described herein.

The feed can have a funnel-shaped insertion region and/or a ramp in order to advantageously insert the guide pin or pins, in particular to insert the latter into the guide grooves.

It is also possible for the feed to be designed as at least one oblong hole within the plug connector housing. However, the described variant with the guide grooves is preferred. In principle, however, the specific design of the feed is not necessarily important.

The at least one guide pin can also engage a side guide of the plug connector housing for displacing the securing element from the pre-securing position into the securing position in order to guide the securing element during the displacement into the securing position.

Particularly preferably, the side guide runs parallel to the longitudinal axis of the plug connector housing (i.e., in the axial direction). The side guide can extend along the side wall or along the side walls of the plug connector housing through which the feed may possibly also run.

The side guide of the plug connector housing can preferably be designed as at least one oblong hole for this purpose. In this case, the at least one guide pin can be guided captively, whereby the side guide or the guidance of the securing element from the pre-securing position into the securing position can be particularly robust.

Preferably, two oblong holes are provided which run through opposite side walls of the outer shell or side walls of the plug connector housing and which guide two corresponding lateral guide pins of the securing element.

An oblong hole can also be suitable for mechanically tensioning the securing element during lifting of the securing region (by the mating plug connector) while simultaneously supporting the securing element by means of its support region, since the oblong hole can block a radial movement component of the securing element.

An oblong hole for guiding the guide pin can also be suitable for enabling a visual inspection to conveniently detect the condition of the securing element, in particular to enable an installer to easily and reliably detect when the securing element has reached the securing position. If necessary or desired, suitable color contrasts between the plug connector housing and the guide pin can be selected for this purpose.

In principle, however, it is also possible to design the side guide in the form of guide grooves or guide channels. According to the invention, the specific design of the side guide is not necessarily important. However, a design of the side guide as oblong holes, as described herein, is particularly preferred.

The guide pin can also be designed to connect the securing element captively to the plug connector housing, preferably in the pre-latching position and/or in the pre-securing position and/or in the securing position. Particularly preferably, the guide pin connects the securing position captively to the plug connector housing in any orientation or position.

In particular, it can be provided that the securing element is connected captively to the plug connector housing in such a way that it can no longer be removed from the plug connector housing without being destroyed.

Preferably, the securing element is connected captively in the pre-latching position by an engagement of the guide pins in the side guide of the plug connector housing, for example by the guide pins engaging in a corresponding oblong hole after the securing element has been pushed in from outside the plug connector and after the pre-latching position has been reached, or by the guide pins engaging the oblong holes from behind once the pre-latching position has been reached. For this purpose, a ramp can optionally be provided within the feed and/or in the guide pins.

In an advantageous refinement of the invention, the securing element has at least one detent element at the front-end portion.

Preferably, two detent elements are provided, wherein the detent elements project laterally from the securing element, for example in the manner of detent hooks or latching arms.

Particularly preferably, the securing region of the securing element is arranged between the two detent elements.

The detent element can be engaged with a lateral guide of the plug connector housing for displacing the securing element from the pre-latching position to the pre-securing position in order to guide the securing element during the displacement into the pre-securing position.

The lateral guide can be formed in the side walls of the plug connector housing, through which the feed and/or side guide possibly also runs.

Preferably, the lateral guide can be in the form of one or more lateral guide grooves. Preferably, two lateral guide grooves are provided, which run on opposite inner faces of the side walls of the plug connector housing.

The lateral guide groove, or the lateral guide grooves, can provide the stroke movement described herein for the displacement of the securing region of the securing element by the mating plug connector until the pre-securing position is reached. The movement of the securing region, and thus the lateral guide groove(s), can preferably be rectilinear or curvilinear. The lateral guide groove(s) can run in such a way that the movement of the securing region is substantially orthogonal to the longitudinal axis of the plug connector housing when the mating plug connector is inserted into the plug connector housing. However, an axial directional component can also be provided if necessary.

The lateral guide can have a funnel-shaped insertion region and/or a ramp to advantageously insert the detent element(s), in particular to insert them into the lateral guide grooves.

The at least one detent element can engage in a detent recess of the plug connector housing to latch the securing element in the securing position and/or in the pre-latching position.

The detent recess can preferably be formed as an indentation in the plug connector housing, in particular in opposite inner faces of the side walls of the outer shell described.

In an advantageous refinement of the invention, the guide of the plug connector housing is configured such that the securing element is displaceable from the pre-securing position into the securing position by a substantially axial movement along the longitudinal axis of the plug connector housing in the direction of the mating plug connector.

In particular, the plug connector housing guide can guide the support region, for example, two lugs protruding laterally from the securing element.

According to a refinement of the invention, the guide of the plug connector housing is configured to guide the support region of the securing element in such a way that the support region performs a radial movement in the direction of the longitudinal axis of the plug connector housing during the axial displacement of the securing element from the pre-securing position into the securing position.

Preferably, this allows the spring region of the securing element to be relaxed (again).

The guide of the plug connector housing can, for example, have an axial portion followed by a mixed radial/axial portion (i.e., an "inclined" portion), possibly followed by a further axial portion, in particular in the form of an elongated "S-curve".

The guide can preferably be designed as one or more grooves. A design with one or more slots or another guide can also be provided. The guide is preferably provided in the aforementioned side walls of the plug connector housing.

Preferably, the guide has a first guide portion extending substantially axially, preferably parallel to the longitudinal axis of the plug connector housing, and a second guide portion adjoining the first guide portion in the direction of the mating plug connector and running obliquely towards the longitudinal axis of the mating plug connector. The second guide portion preferably runs obliquely in the direction of the longitudinal axis of the plug connector housing.

Preferably, the guide of the plug connector housing together with the support region of the securing element forms a slotted-link control system, wherein the guide forcibly guides the support region, in particular lateral lugs of the securing element.

Also, the guide pin together with the feed, the guide pin together with the side guide, and/or the detent element together with the lateral guide can each be designed in the manner of a slotted-link control system.

In a refinement of the invention, the securing element is formed in one part.

In principle, however, the securing element can also be of a multi part design, wherein, for example, the securing region, the support region and/or the intermediate spring region can be formed from components that are independent of one another and together form the securing element. Particularly preferably, however, the securing element is formed in one part.

Preferably, the securing element can be formed from a plastic.

In one embodiment of the invention, the securing element has an actuation region. Preferably, the actuation region can be arranged at a rear end portion of the securing element. The actuation region can be used by a user of the plug connection to displace the securing element from the pre-securing position into the securing position—or vice versa—using a tool or also by a manual actuation, for example by means of a finger (or to trigger an automatic, spring-force-based displacement).

By moving the securing element axially backwards against the insertion movement of the mating plug connector, for example using a tool or by displacing the actuation region of the securing element, the primary latching or the locking securement means can be unlocked again if required. Before unlocking, it may be necessary to release a latching between the detent elements of the securing element and the detent recesses of the plug connector housing, for example by applying increased force.

While the securing element is moving back from the securing position to the pre-securing position, the securing element or the spring region of the securing element can be tensioned again.

As long as the mating plug connector is not yet unplugged from the plug connector or as long as the locking securement means, for example a detent rocker, for unlocking the mating plug connector is not yet unlocked, the securing element preferably cannot yet move back from the pre-securing position to the pre-latching position, since the detent hook of the mating plug connector still blocks the further movement of the securing element. Only when the mating plug connector is unplugged, or the detent hook of the mating plug connector is removed from the recess, can the securing element preferably be automatically moved back to the pre-latching position.

The invention also relates to a securing element for an electrical plug connector.

Advantageously, a securing element mounted stress-free or a CPA mounted stress-free can be provided. Preferably, the securing element is mounted stress-free in the electrical plug connector both in the pre-latching position and in the securing position.

The invention further relates to an electrical plug connection, having an electrical plug connector and an electrical mating plug connector corresponding to the plug connector. The plug connector has a plug connector housing, a locking securement means for locking the plug connector to the mating plug connector, and a securing element displaceable between a pre-latching position and a securing position. The securing element blocks the locking securement means in the securing position to prevent unlocking of the mating plug connector. The plug connector housing forms a feed, along which the securing element is displaceable from outside the plug connector housing in the direction of the longitudinal axis of the plug connector housing into the pre-latching position. Alternatively, or additionally, the securing element is positioned in the pre-latching position in the plug connector housing in such a way that the securing element is brought by the insertion of the mating plug connector into a pre-securing position in which the securing element is mechanically tensioned, wherein the plug connector housing forms a guide along which the securing element is displaceable from the pre-securing position into the securing position and in so doing mechanically relaxes.

Preferably, the securing element is not mechanically loaded in the pre-latching position until the mating plug connector is inserted, in that a front-end portion of the securing element is "lifted" into the pre-securing position by the mating plug connector.

In an advantageous manner, an electrical plug-in connection with a securing element, or with a CPA, can be realized in a very small installation space in accordance with the invention.

According to a refinement of the invention, the mating plug connector has a detent hook configured to latch with the locking securement means of the plug connector when the mating plug connector is inserted into the plug connector.

During insertion of the mating plug connector, the detent hook can penetrate the plug connector housing of the plug connector in such a way that the detent hook moves the securing element, starting from the pre-latching position, into the pre-securing position.

Due to the high vibration resistance and service life, the plug-in connection is suitable for transmitting electrical data signals with high priority and/or for transmitting electrical supply signals with hazard potential or with high safety requirements (such as in the case of a high-voltage connection). Accordingly, the plug-in connection according to the invention is particularly suitable for use in a vehicle, in particular in a motor vehicle.

In principle, the plug connection can also be well suited for transmitting optical signals and/or for transmitting electromagnetic waves.

The term "vehicle" describes any means of transport, in particular vehicles on land, water or in the air, including spacecraft.

Possible fields of application include autonomous driving, driver assistance systems, navigation systems, "infotainment" systems, rear seat entertainment systems, internet connectivity and wireless gigabit (IEEE 802.11 ad standard). Potential applications include high-resolution cameras, for example 4K and 8K cameras, sensor technology, onboard computers, high-resolution screens, high-resolution dashboards, 3D navigation devices, and mobile radio devices.

In principle, however, the plug connection according to the invention is suitable for any applications within the entire field of electrical engineering and is not to be understood as being restricted to use in automotive engineering.

The electrical plug connector and the electrical plug-in connection are also not limited to a specific plug connector type, wherein the invention is particularly suitable for plug connectors and plug connections for high-frequency technology. In particular, the plug connectors or plug connections can be of the PL, BNC, TNC, SMBA (FAKRA), SMA, SMB, SMS, SMC, SMP, BMS, HFM (FAKRA-Mini), H-MTD, BMK, Mini-Coax or MATE-AX type.

Very particularly preferably, the invention is suitable for use with an electrical plug connector or electrical plug connection in accordance with a waterproof FAKRA standard, for example for transmitting camera signals and/or for mounting in the region of exterior mirrors or bumpers of a motor vehicle.

The invention can be equally suitable for angled plug connectors as well as non-angled or straight plug connectors.

The invention also relates to an assembly method of an electrical plug connector, having a plug connector housing, a locking securement means for locking the plug connector to a corresponding electrical mating plug connector, and a securing element displaceable between a pre-latching position and a securing position. The assembly method provides that the securing element is inserted along a feed of the plug connector housing from outside the plug connector housing in the direction of the longitudinal axis of the plug connector housing into the pre-latching position.

The invention additionally relates to a method of securing an electrical plug connection, having an electrical plug connector and an electrical mating plug connector corresponding to the plug connector. The plug connector has a plug connector housing, a locking securement means for locking the plug connector to the mating plug connector, and securing element. The securing element is moved from a pre-latching position to a securing position. In the securing position, the securing element blocks the locking securement means to prevent unlocking of the mating plug connector. It is further provided to move the securing element into a pre-securing position by inserting the mating plug connector, thereby mechanically tensioning the securing element. It is further provided to move the securing element along a guide of the plug connector housing from the pre-securing position into the securing position, thereby mechanically relaxing the securing element.

Features that have been described in conjunction with the electrical plug connector according to the invention can of course also be advantageously implemented for the securing element, the electrical plug connection and the methods mentioned—and vice versa. Furthermore, advantages that have already been disclosed and described mentioned in conjunction with the electrical plug connector according to the invention can also be understood as relating to the securing element, the electrical plug-in connection and the methods—and vice versa.

Terms such as "comprising", "having" or "with" do not exclude other features or steps. Furthermore, terms such as "a" or "the" that indicate a singular number of steps or features do not exclude a plurality of features or steps—and vice versa.

The values and parameters described herein include deviations or fluctuations of ±10% or less, preferably ±5% or less, further preferably ±1% or less, and very particularly preferably ±0.1% or less of the particular designated value or parameter, provided that these deviations are not excluded in the implementation of the invention in practice. The specification of ranges by initial and final values also includes all those values and fractions which are included by the particular designated range, in particular the initial and final values and a corresponding mean value.

Exemplary embodiments of the invention are described in more detail below with reference to the accompanying Figures.

The Figures each show preferred exemplary embodiments in which individual features of the present invention are shown in combination with one another. Features of one exemplary embodiment can also be implemented separately from the other features of the same exemplary embodiment and can accordingly be readily combined by a person skilled in the art to form further useful combinations and sub-combinations with features of other exemplary embodiments.

SUMMARY

My electrical plug connector, electrical plug connection and securing element for an electrical plug connector generally provides an electrical plug connector, having a plug connector housing, a locking securement means for locking the plug connector to a corresponding electrical mating plug connector, and a securing element displaceable between a pre-latching position and a securing position.

A principal aspect of the present invention is an electrical plug connector (1), having a plug connector housing (2), a locking securement means (5) for locking the plug connector (1) to a corresponding electrical mating plug connector (6), and a securing element 12 displaceable between a pre-latching position and a securing position, wherein the securing element (12) blocks the locking securement means (5) in the securing position to prevent unlocking of the mating plug connector (6), characterized in that the plug connector housing (2) forms a feed (14) along which the securing element (12) is displaceable from outside the plug connector housing (2) in the direction of the longitudinal axis (L) of the plug connector h in (2) into the pre-latching position; and/or the securing element (12) is positioned in the pre-latching position in the plus connector housing (2) in such a way that the securing element (12) is brought by the insertion of the mating plug connector (6) into a pre-securing position in which the securing element (12) is mechanically tensioned wherein the plug connector housing (2) forms a guide (21) along which the securing element (12) is displaceable from the pre-securing position into the securing position and in so doing mechanically relaxes.

A further aspect of the present invention is an electrical plug connector (1) characterized in that the displacement path for the securing element (12) ends in the securing position in which the securing element (12) is positioned between a detent portion (11) of the locking securement means (5) and an outer wall (2.1) of the plug connector housing (2) to block the locking securement means (5).

A further aspect of the present invention is an electrical plug connector (1) characterized in that the feed (14) is formed in the plug connector housing (2) in such a way that the securing element (12) is displaceable into the pre-latching position by a movement running substantially orthogonally to the longitudinal axis (L) of the plug connector housing (2).

A further aspect of the present invention is an electrical plug connector (1) characterized in that the securing element (12) has a securing region (13), a support region (17) and a spring region (18) in-between wherein the securing region (13) is arranged at a front end portion of the securing element (12) facing the mating plug connector (6) and the support region (17) is arranged at a rear end portion of the securing element (12) opposite the front end portion along the longitudinal axis (L) of the plug connector housing (2) when the securing element (12) is inserted into the plug connector housing (2).

A further aspect of the present invention is an electrical plug connector (1) characterized in that the securing element (12) is positioned in the pre-latching position in the plug connector housing (2) in such a way that the insertion of the mating plug connector (6) leads to a displacement of the securing region (13) of the securing element (12) running substantially orthogonally to the longitudinal axis (L), while the securing element (12) is supported with the support region (17) on the plug connector housing (2) in such a way that the spring region (18) in-between is mechanically braced.

A further aspect of the present invention is an electrical plug connector (1) characterized in that the securing region (13) of the securing element (12) in the pre-latching position is positioned in a recess (9) in the locking securement means (5) In such a way that the securing region (13) is in a displacement path of a detent hook (8) of the mating plug connector (6) in order to be displaced by the detent hook (8) into the pre-securing position during insertion of the mating plug connector (6).

A further aspect of the present invention is an electrical plug connector (1) characterized in that the securing element (12) is spaced from the mating plug connector (6) in the securing position.

A further aspect of the present invention is an electrical plug connector (1) characterized in that the securing element (12) has at least one guide pin (15) which is engageable with the feed (14) of the plug connector housing (2) for displacing the securing element (12) into the pre-latching position in order to guide the securing element (12) during the displacement into the pre-latching position; and/or is engaged with a side guide (16) of the plug connector housing (2) for displacing the securing element (12) from the pre-securing position into the securing position in order to guide the securing element (12) during the displacement into the securing position; and/or the securing element (12) is captively connected to the plug connector housing (2).

A further aspect of the present invention is an electrical plug connector (1) characterized in that the securing element (12) has, at the front end portion, at least one detent element (19) which is engaged with a lateral guide (20) of the plug connector housing (2) for displacing the securing element (12) from the pre-latching position into the pre-securing position in order to guide the securing element (12) during the displacement into the pre-securing position; and/or engages in a detent recess (22) of the plug connector housing (2) to latch the securing element (12) in the securing position.

A further aspect of the present invention is an electrical plug connector (1) characterized in that the guide (21) of the plug connector housing (2) Is designed in such a way that the securing element (12) is displaceable from the pre-securing position into the securing position by a substantially axial movement along the longitudinal axis (L) of the plug connector housing (2) in the direction of the mating plug connector (6).

A further aspect of the present invention is an electrical plug connector (1) characterized in that the guide (21) of the plug connector housing (2) is designed to guide the support region (17) of the securing element (12) in such a way that the support region (17) performs a radial movement in the direction of the longitudinal axis (L) of the plug connector housing (2) during the axial displacement of the securing element (12) from the pre-securing position into the securing position.

A further aspect of the present invention is an electrical plug connector (1) characterized in that the securing element (12) is formed in one part.

A further aspect of the present invention is a securing element (12) for an electrical plug connector (1).

A still further aspect of the present invention is an electrical plug connection (7), having an electrical plug connector (1) and an electrical mating plug connector (6) corresponding to the plug connector (1), wherein the plug connector (1) has a plug connector housing (2), a locking securement means (5) for locking the plug connector (1) to the mating plug connector (6), and a securing element (12) which is displaceable between a pre-latching position and a securing position, wherein the securing element (12) blocks the locking securement means (5) in the securing position in order to prevent unlocking of the mating plug connector (6), characterized in that the plug connector housing (2) forms a feed (14) along which the securing element (12) is displaceable from outside the plug connector housing (2) in the direction of the longitudinal axis (L) of the plug connector housing (2) into the pre-latching position; and/or the securing element (120 is positioned in the pre-latching position in the plug connector housing (2) in such a way that the securing element (12) is brought by the insertion of the mating plug connector (6) into a pre-securing position in which the securing element (12) is mechanically tensioned wherein the plug connector housing (2) forms a guide (21) along which the securing element (12) is displaceable from the pre-securing position into the securing position and in so doing mechanically relaxes.

An even still further aspect of the present invention is an electrical plug connector (7) characterized in that the mating plug connector (6) has a dent hook (8) which is designed to latch with the locking securement means (5) of the plug connector (1) when the mating plug connector (6) is inserted into the plug connector (1), wherein the detent hook (8) penetrates into the plug connector housing (2) of the plug connector (1) during the insertion of the matins plug connector (6), in such a way that the detent hook (8) moves the securing element (12) from the pre-latching position into the re-securing position.

These and other aspects of the present invention are more fully described, disclosed and set forth herein.

BRIEF DESCRIPTIONS OF THE FIGURES

In the Figures, functionally identical elements are provided with the same reference signs.

The Figures show schematically.

DETAILED WRITTEN DESCRIPTION OF THE PREFERRED EMBODIMENTS

This disclosure of the invention is submitted in furtherance of the Constitutional purposes of the US Patent Laws "to promote the progress of Science and the useful arts" (Article 1, Section 8).

Figure 1:
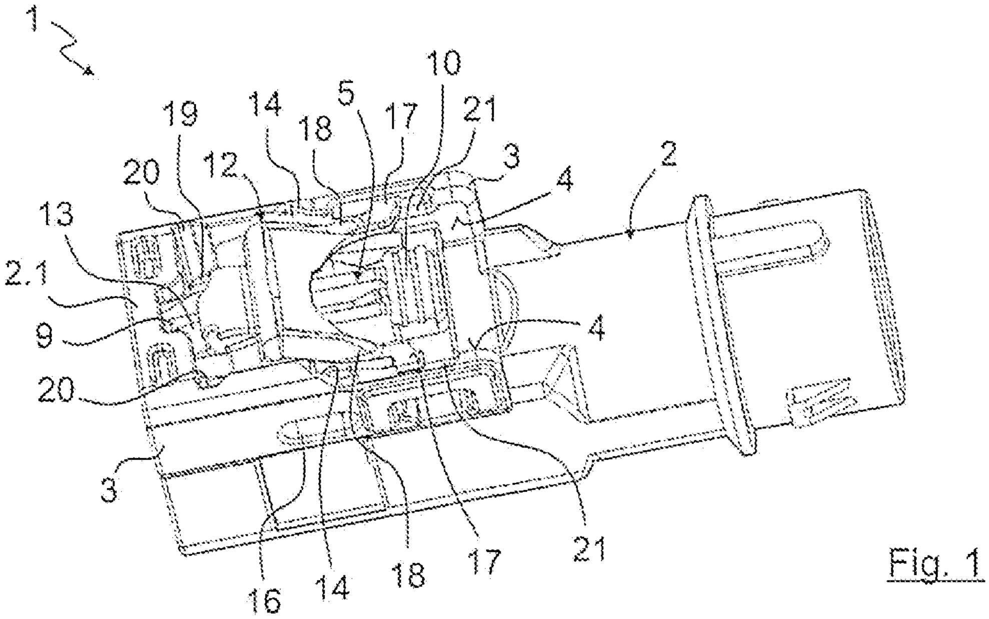
FIG. 1 shows an electrical plug connector according to the invention with a plug connector housing, a locking securement means and a securing element in a pre-latching position, in a perspective view.
Figure 2:
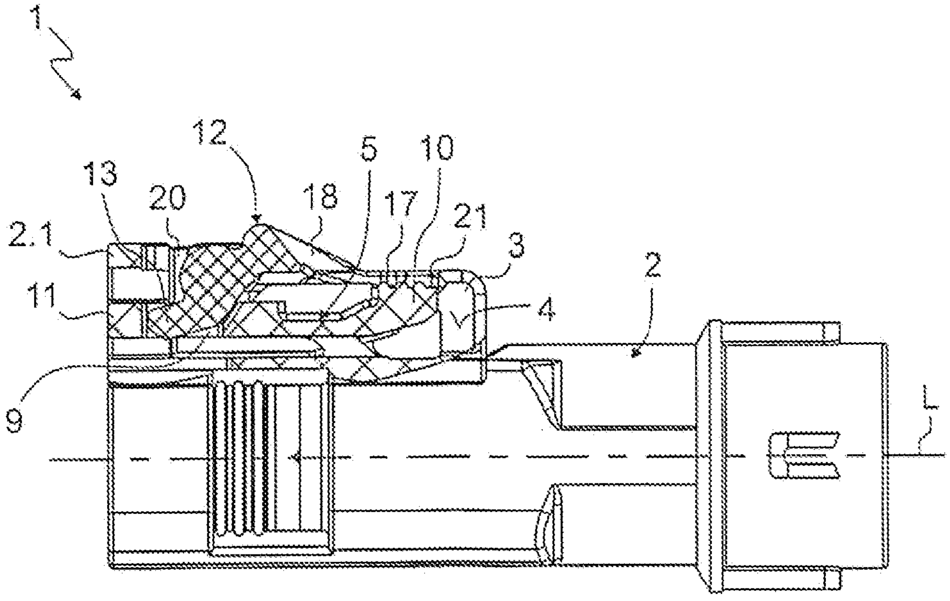
FIG. 2 shows the plug connector of FIG. 1 in a sectional view along line of section it of FIG. 4.
Figure 3:
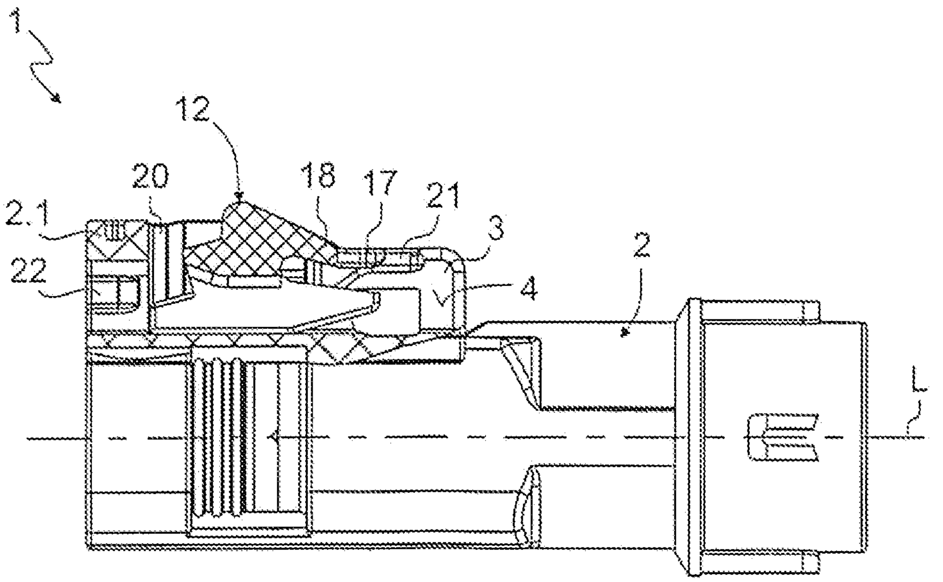
FIG. 3 shows the plug connector of FIG. 1 in a sectional view along line of section III of FIG. 4.
Figure 4:
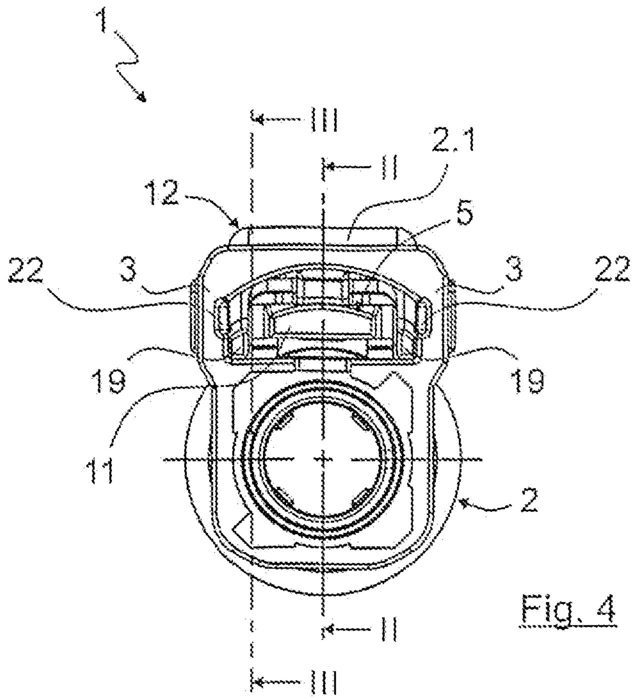
FIG. 4 shows the plug connector of FIG. 1 in a view from the front.
Figure 5:
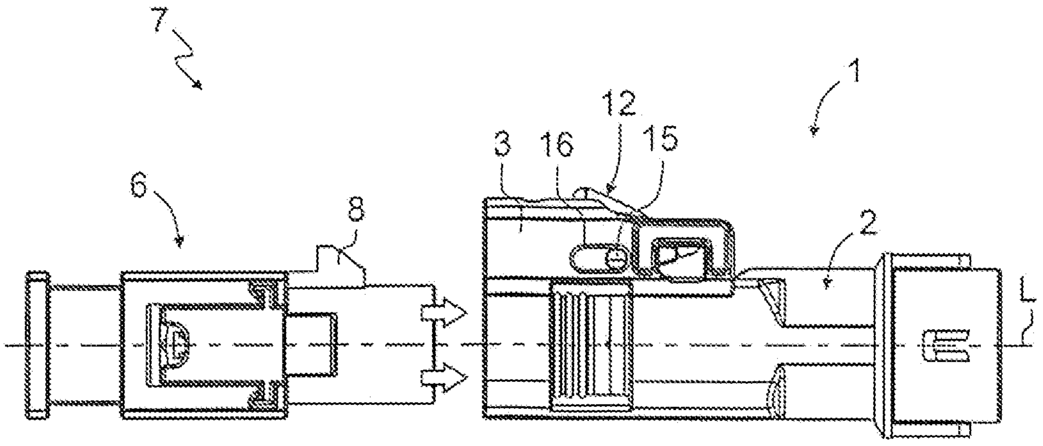
FIG. 5 shows the plug connector of FIG. 1 and a corresponding mating plug connector not yet plugged into the plug connector, in a side view.
Figure 11:
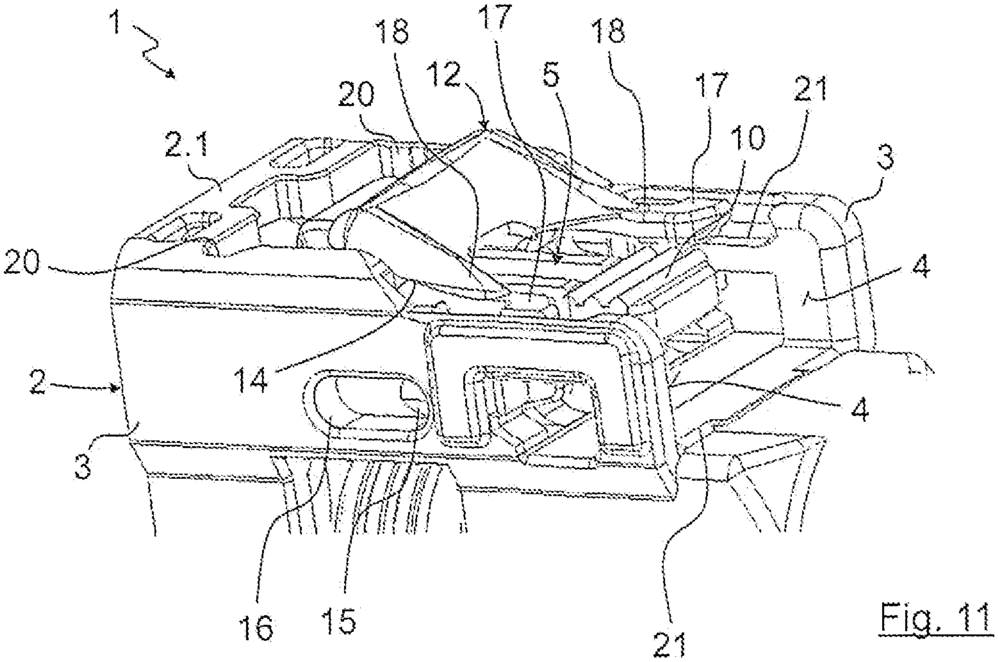
FIG. 11 shows a detail enlargement of the plug connector of FIG. 1 in a perspective view.

FIG. 1 shows a perspective view of an electrical plug connector 1 according to the invention. FIGS. 2 to 4 show the plug connector 1 in the state shown in FIG. 1 in further representations, and FIG. 11 also shows an enlarged detail of the plug connector 1 in a perspective view.

The electrical plug connector 1 has a plug connector housing 2, for example a plastic housing. The plug connector housing 2 forms an outer shell with two side walls 3, which each have mutually opposing inner faces 4.

The plug connector 1 also has a locking securement means 5 for locking the plug connector 1 to a corresponding mating plug connector 6. In the exemplary embodiment, the locking securement means 5 is designed as a detent rocker.

A locked electrical plug connection 7, having the electrical plug connector 1 and the electrical mating plug connector 6, is shown in figures FIGS. 6 to 8 and 10.

The mating plug connector 6 can, for example, use a detent hook 8 to engage behind a recess 9 in the detent rocker, or the locking securement means 5, and in this way can form a so-called primary securement means together with the locking securement means 5. This can be seen particularly well in FIGS. 6 and 7. To unlock the mating plug connector 6, an actuation portion 10 of the detent rocker, or of the locking securement means 5, can be actuated in the direction of a longitudinal axis L of the plug connector 1 in order to lift a detent portion 11 of the detent rocker, or of the locking retainer S, which is opposite the actuation portion 10, in order to release the detent hook 8 of the mating plug connector 6. Such detent rockers or locking securement means 5 or primary securement means are already known in principle, which is why the exact operating principle will not be discussed in more detail.

The electrical plug connector 1 further comprises a securing element 12 that is displaceable between a pre-latching position and a securing position, whereat the securing element blocks the locking securement means 5 in the securing position to prevent unintentional unlocking of the corresponding mating plug connector 6 from the electrical plug connector 1. A securing element 12 for securing a primary latching is also known as "connector position assurance" (CPA). The securing element 12 is shown separately in a perspective view in FIG. 13. In the exemplary embodiment, the securing element 12 is formed in one part, but in principle it can also be formed in several parts. Preferably, the securing element 12 is made of a plastic.

FIGS. 1 to 5 and 11 each show the securing element 12 in the pre-latching position, whereas FIGS. 7 to 10 show the securing element 12 in the securing position.

Figure 7:
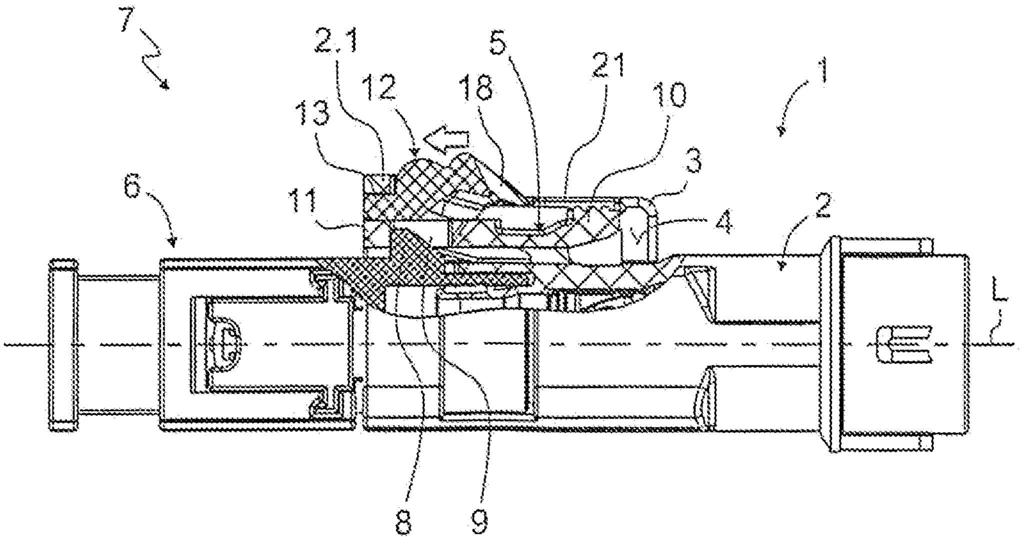
FIG. 7 shows the secured electrical plug connection with the securing element in the securing position in a partially sectional side view according to line of section II of FIG. 4.
Figure 8:
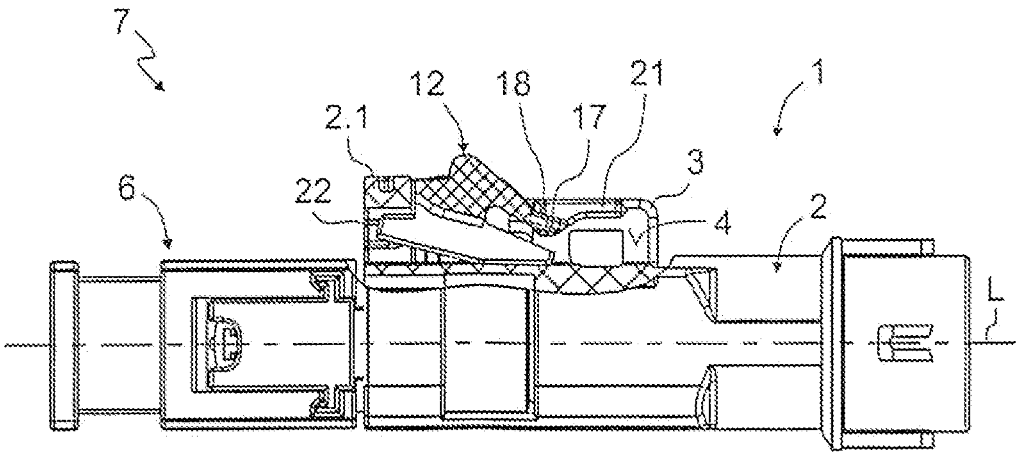
FIG. 8 shows the secured plug connection of FIG. 7 in a partially sectional side view according to line of section III of FIG. 4.
Figure 9:
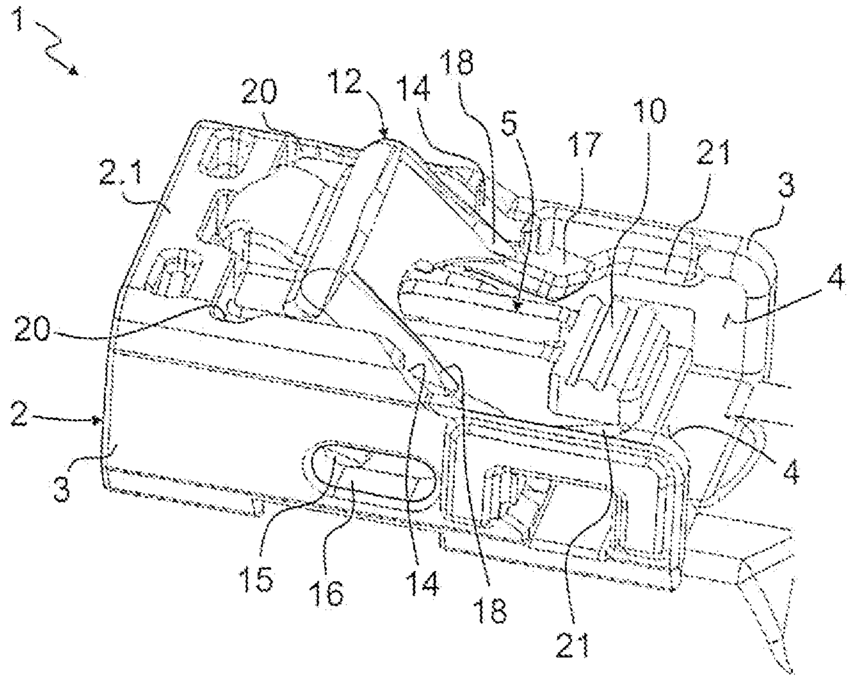
FIG. 9 shows the secured plug connection of FIG. 7 in a perspective view, wherein the mating plug connector is hidden.
Figure 10:
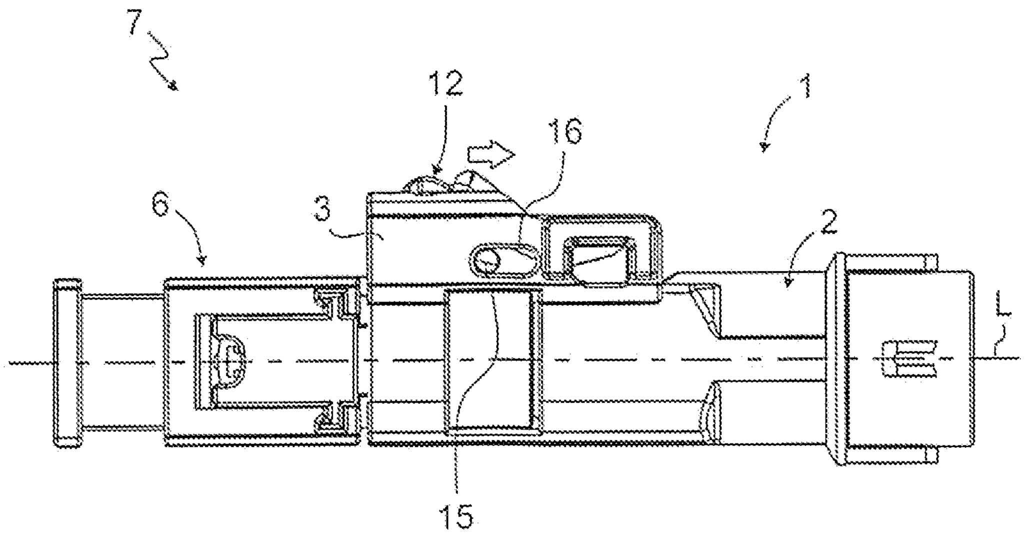
FIG. 10 shows the secured plug connection shown in FIG. 7 while the securing element is being unlocked, in a side view.

As can be seen particularly well in FIG. 7, in the securing position the securing element 12 interlockingly blocks the locking securement means 5, or the detent rocker, with a securing region 13. For this purpose, the securing region 13 of the securing element 12 is positioned between the detent portion 11 of the locking securement means 5 and an outer wall 2.1 of the plug connector housing 2. Preferably, starting from the securing position, the securing element 12, or its securing region 13, cannot be axially displaced any further in the direction of the corresponding mating plug connector 6. Preferably, the displacement path of the securing element 12 ends in such a way that the securing region 13 of the securing element 12 does not protrude from the plug connector housing 2 beyond the detent portion 11.

Figure 12:
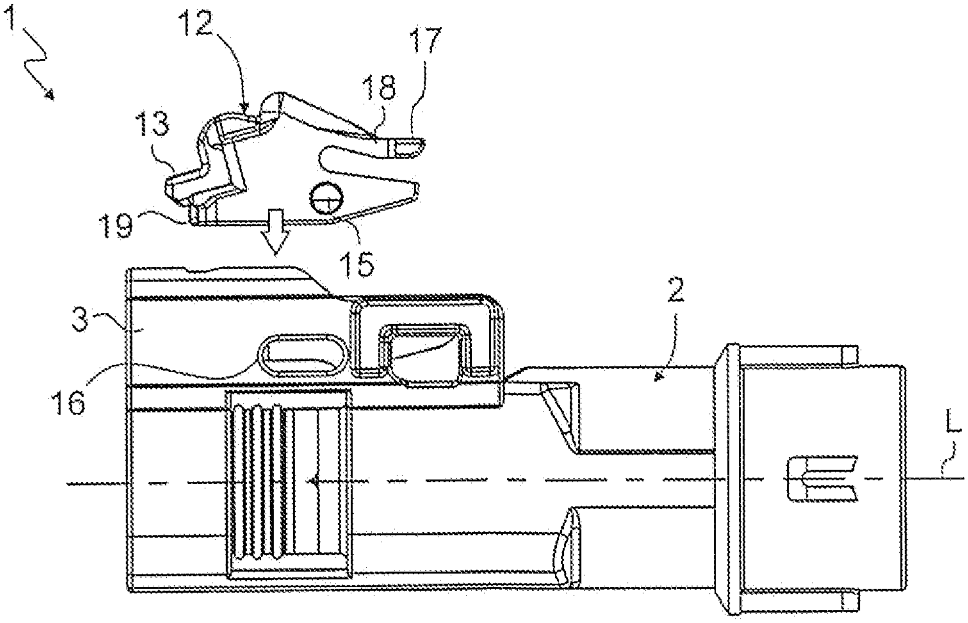
FIG. 12 shows the electrical plug connector with the securing element in an unassembled position outside the plug connector housing, in a side view.

It is provided that the plug connector housing 2 forms a feed. The feed is formed by two guide grooves 14 running along the two inner faces 4 of the side walls 3 of the plug connector housing 2. The guide grooves 14 can be seen in FIG. 9. The securing element 12 is displaceable along the feed, or along the guide grooves 14, starting from outside the plug connector housing 2 for assembly thereof in the direction toward the longitudinal axis L of the plug connector housing 2 into the pre-latching position, as indicated in FIG. 12. In so doing, the securing element 12 is displaceable into the pre-latching position by a movement running substantially orthogonally to the longitudinal axis L of the plug connector housing 2.

The securing element 12 has guide pins 15 on both sides, which can be engaged with the feed, or with the guide grooves 14, of the plug connector housing 2 for displacing the securing element 12 into the pre-latching position in order to guide the securing element 12 during the displacement into the pre-latching position.

Furthermore, it can be provided that the securing element 12 is connected captively to the plug connector housing 2 in the pre-latching position. In the exemplary embodiment, the guide pins 15 engage behind a side guide of the plug connector housing 2 for this purpose, which in the exemplary embodiment is formed by two opposing oblong holes or slots 16 defined in the side walls 3 of the plug connector housing 2. In order to facilitate the insertion of the securing element 12, or the guide pins 15, into the slots 16, the guide pins 15 have an optional chamfer.

In the pre-latching position, the securing element 12 is arranged in the plug connector housing 2 in such a way that the securing element 12 is completely mechanically relaxed.

In the pre-latching position, the securing element 12 is also positioned in the plug connector housing 2 in such a way that when the corresponding mating plug connector 6 is inserted, the securing element 12 is brought into a pre-securing position in which the securing element 12 is mechanically tensioned. The pre-securing position is shown in FIG. 6.

Figure 6:
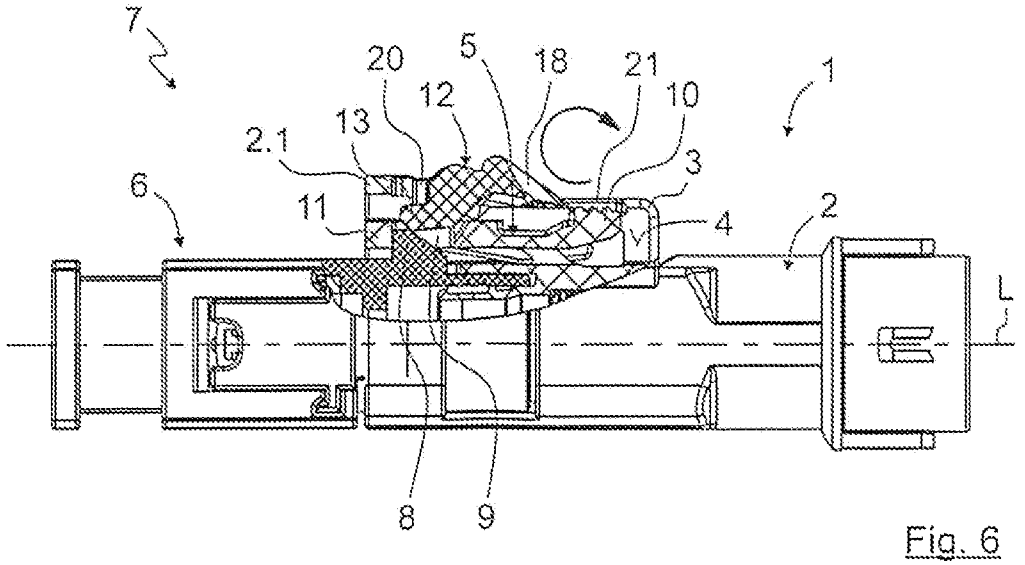
FIG. 6 shows an electrical plug connection, having the electrical plug connector and the fully inserted electrical mating plug connector, with the securing element in the pre-securing position in a partially sectional side view according to line of section it of FIG. 4.

As can be seen from in FIG. 6, insertion of the corresponding mating plug connector 6 results in a displacement of the securing region 13 of the securing element 12 (i.e., a “lifting movement”) that is substantially orthogonal to the longitudinal axis L of the plug connector housing 2, while at the same time the securing element 12 supports itself with its rear end portion against the plug connector housing 2. For this purpose, the securing element 12 has a support region in its rear end portion, which is formed by two laterally projecting lugs 17 (see for example FIG. 13). As a result of the support of the securing element 12 with its support region or with the lugs 17 on the plug connector housing 2 in combination with the forced guidance of the guide pins 15 of the securing element 12 in the slots 16, a spring region arranged between the securing region 13 and the support region, which spring region is formed by two spring arms 18 (see FIG. 13), is tensioned.

It can be seen that the securing region 13 of the securing element 12 is positioned in the pre-latching position in the recess 9 of the locking securement means 5, or the detent rocker, in such a way that the securing region 13 is located in the displacement path of the detent hook 8 of the corresponding mating plug connector 6. By inserting the corresponding mating plug connector 6, the securing region 13 of the securing element 12 can thus be lifted and thereby brought into the pre-securing position.

Figure 13:
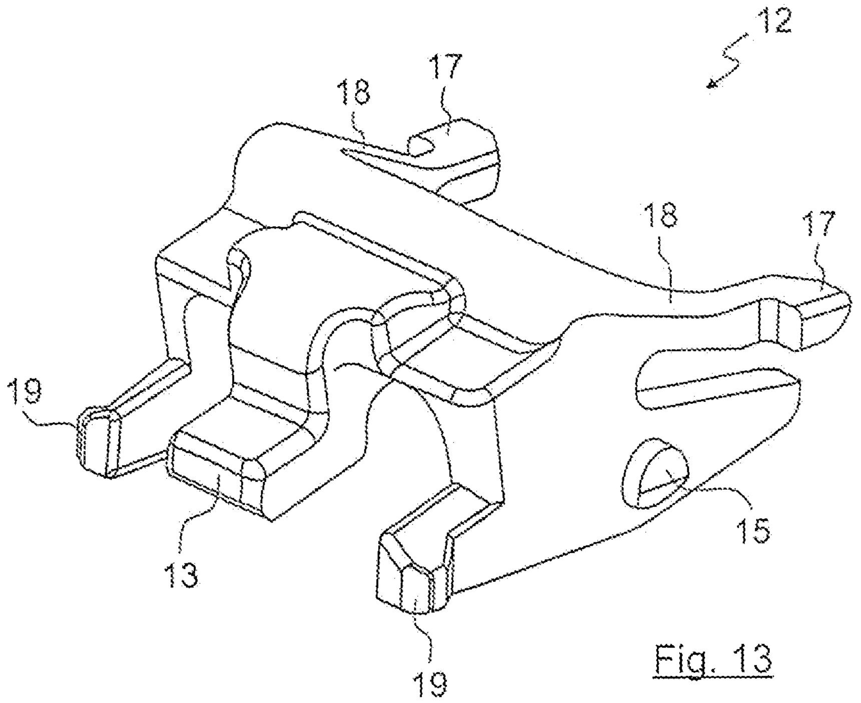
FIG. 13 shows the securing element in a single perspective view.

The securing element 12 can have at least one detent element 19 at its front-end portion, in the exemplary embodiment two detent elements 19 (see for example FIG. 13). The securing element 12 is arranged between the two detent elements 19. The detent elements 19 can be engaged with a lateral guide of the plug connector housing 2 for displacing the securing element 12 from the pre-latching position into the pre-securing position, in order to guide the securing element 12 during displacement into the pre-securing position. In the exemplary embodiment, the lateral guide is formed by two lateral guide grooves 20 on the inner faces 4 of the side walls 3 of the plug connector housing 2 (see for example FIG. 1).

It is further provided that the plug connector housing 2 forms a guide along which the securing element 12 is displaceable from the pre-securing position to the securing position while it mechanically relaxes. In the exemplary embodiment, the guide is formed by two grooves 21 formed in the side walls 3 (see for example FIG. 1 or FIG. 9). At the same time, the securing element 12 is guided by its guide pins 15 in the slots 16.

As a result of the fact that the securing element 12 is tensioned in the pre-securing position, it “strives” for the relaxed securing position and can move into the securing position independently, optionally by release by a user.

The guide, or the two grooves 21, of the plug connector housing 2 are designed in such a way that, in addition to a substantially axial movement along the longitudinal axis L of the plug connector housing 2 in the direction of the corresponding mating plug connector 6, the securing element 12 also undergoes a tilting in that the support region or in that the two lugs 17 of the securing element 12 approach the longitudinal axis L of the plug connector housing 2. The grooves 21 thus have an axial portion followed by a mixed axial/radial portion, or rather an oblique portion.

In the securing position, the securing element 12 can be advantageously spaced from the mating plug connector 6, in particular spaced from the detent hook 8 of the mating plug connector 6, as can be seen particularly well in FIG. 7. In this way, a load on the securing element 12 can be avoided.

It can be provided that the securing element 12 in the securing position engages with its detent elements 19 in corresponding detent recesses 22 of the plug connector housing 2 (see FIG. 4).

It should be emphasized that the electrical plug connector 1 shown in FIGS. 1 to 12 and the described securing element 12 are to be understood merely as examples.

In principle, the invention is suitable for use with a plug connector 1 of any design or for use with any electrical plug connection 7. Preferably, however, the electrical plug connector 1 is designed as a FAKRA plug connector (in particular as a waterproof FAKRA plug connector), as shown in the exemplary embodiment.

OPERATION

Having described the structure of our electrical plug connector electrical plug connection and securing element for an electrical plug connector its operation is briefly described.

A principal object of the present invention is an electrical plug connector (1) comprising: a plug connector housing (2), that defines a feed for a securing element and a longitudinal axis (L); a locking securement means (5) carried on the plug connector housing for locking the electrical plug connector (1) to a corresponding electrical mating plug connector; (6), and wherein the securing element (12) is displaceable between a pre-latching position and a securing position and wherein the securing element (12) blocks the locking securement means (5) in the securing position to prevent unlocking of the electrical plug connector from the corresponding electrical mating plug connector (6); and wherein the securing element (12) is displaceable along the feed defined by the plug connector housing from outside the plug connector housing (2) in the direction of the longitudinal axis (L) of the plug connector housings (2) into the pre-latching position, and wherein the securing element (12) has at least one guide pin (15) which is engageable with the feed (14) of the plug connector housing (2) for displacing the securing element (12) into the pre-latching position so as to guide the securing element (12) during the displacement into the pre-latching position and wherein the feed (14) of the pug connector housing (2) is a guide groove on an inner face (4) of a side wall (3) of the plug connector housing (2).

A further object of the present invention is an electrical plug connector (1) and wherein a displacement path for the securing element (12) ends when the securing element is in the securing position, and whereat the securing element (12) is between a detent portion (11) of the locking securement means (5) and an outer wall (2.1) of the plug connector housing (2) to block the locking securement means (5).

A further object of the present invention is an electrical plug connector (1) and wherein the feed (14) is formed in the plug connector housing (2) in such a way that the securing element (12) is displaceable into the pre-latching position by a movement running substantially orthogonally to the longitudinal axis (L) of the plug connector housing (2).

A further object of the present invention is an electrical plug connector (1) and wherein the securing element (12) is positioned in the pre-latching position in the plug connector housing (2) in such a way that insertion of the corresponding electrical mating plug connector (6) into the electrical plug connector leads to a displacement of the securing region (13) of the securing element (12) running substantially orthogonally to the longitudinal axis (L), while the securing element (12) is supported with the support region (17) on the plug connector housing (2) in such a way that the spring regions (18) in-between is mechanically braced.

A further object of the present invention is an electrical plug connector (1) and wherein that the securing region, (13) of the securing element (12), when in the pre-latching position is positioned in a recess (9) in the locking securement means (5) in such a way that the securing region (13) is in a displacement path of a detent hook (8) of the corresponding electrical mating plug connector (6) in order to be displaced by the detent hook (8) into the pre-securing position during insertion of the corresponding electrical mating plug connector (6) into the electrical plug connector.

A further object of the present invention is an electrical plug connector (1) and wherein the securing element (12) is spaced from the corresponding electrical mating plug connector (6) in the securing position.

A further object of the present invention is an electrical plug connector (1) and wherein the least one guide pin (15) of the securing element is engaged with a side guide (16) of the plug connector housing (2) for displacing the securing element (12) from the pre-securing position into the securing position in order to guide the securing element (12) during the displacement into the securing position.

A further object of the present invention is an electrical plug connector (1) and wherein the securing element (12) has at the front-end portion, at least one detent element (19) which is engaged with a lateral guide (20) of the plug connector housing (2) for displacing the securing element (12) from the pre-latching position into the pre-securing position in order to guide the securing element (12) during the displacement into the pre-securing position.

A further object of the present invention is an electrical plug connector (1) and wherein the guide (21) of the plug connector housing (2) is designed to guide the support region (17) of the securing element (12) in such a way that the support region (17) performs a radial movement in the direction of the longitudinal axis (L) of the plug connector housing (2) during axial displacement of the securing element (12) from the pre-securing position into the securing position.

A further object of the present invention is an electrical plug connector (1) wherein the securing element (12) is formed in one part.

A further object of the present invention is an electrical plug connection (7) comprising: an electrical plug connector; (1) and an electrical mating glue connector (6) corresponding to the electrical plug connector; and (1), wherein the electrical plug connector (1) has a blue connector housing (2), a locking securement means (5) for locking the electrical plug connector (1) to the electrical mating plug connector (6), and a securing element (12) which is displaceable between a pre-latching position and a securing position, whereat the securing element (12) blocks the locking securement means (5) in the securing position to prevent unlocking the electrical mating plug connector (6), from the electrical plug connector; and wherein the plug connector housing (2) forms a feed (14) along which the securing element (12) is displaceable into the pre-latching position from outside the plug connector housing (2) in the direction of the longitudinal axis (L) of the plug connector housing (2) and wherein the securing element (12) has at least one guile pin (15) which is engageable with the plug connector housing (2) feed (14) for displacing the securing element (12) into the pre-latching position in order to guide the securing element (12) during the displacement into the pre-latching position, and wherein the plug connector housing feed (14) is in the form of one or more guide grooves which extend an inner face (4) of a side wall (3) of the plug connector housing.

A further object of the present invention is an electrical plug connector (7) wherein the mating plug connect (6) has a detent hook (8) which is designed to latch with the locking securement means (5) of the electrical plug connector (1) when the mating plug connector (6) is inserted into the electrical plug connector (1), wherein the detent hook (8) penetrates into the plug connector housing (2) of the electrical plug connector (1) during the insertion of the mating plug connector (6), in such a way that detent hook (8) moves the securing element (12) from the pre-latching position into the pre-securing position.

A further object of the present invention is an electrical plug connector comprising: a plug connector housing, that defines a guide for guiding movement of a securing element, and a longitudinal axis (L); a locking securement means carried on the plug connector housing for locking the electrical plug connector to a corresponding electrical mating plug connector; and the securing element has a securing region at a front end portion, a support region at a rear end portion, and a spring region between the securing region and the support region, and the securing region faces the corresponding electrical mating plug connector, and the support region is opposite the front end portion along the longitudinal axis (L) of the plug connector housing when the securing element is inserted into the plug connector housing, and the securing element is displaceable between a pre-latching position and a securing position, and the securing element blocks the locking securement means in the securing position to prevent unlocking of the electrical plug connector from the corresponding electrical mating plug connector; and the securing element is positioned in the pre-latching position, in the plug connector housing, in such a way that the securing element is mechanically tensioned by insertion of the corresponding electrical mating plug connector into a pre-securing position, and wherein the guide defined in the plug connector housing guides displacement of the securing element from the pre-securing position into the securing position which releases the mechanical tension; and wherein the plug connector housing guide, guides the support region of the securing element in such a way that the support region performs a radial movement in the direction of the longitudinal axis (L) of the plug connector housing during axial displacement of the securing element from the pre-securing position into the securing position.

A further object of the present invention is an electrical plug connector wherein the securing element is formed in one part.

A further object of the present invention is an electrical plug connection comprising: an electrical plug connector; and an electrical mating plug connector corresponding to the electrical plug connector; and wherein the electrical plug connector has a plug connector housing, a locking securement means for locking the electrical plug connector to the electrical mating plug connector, and a securing element which is displaceable between a pre-latching position and a securing position, whereat the securing element blocks the locking securement means in the securing position to prevent unlocking the electrical mating plug connector from the electrical plug connector; and wherein the securing element has a securing region at a front-end portion a support region rear end portion, and a spring region between the securing region and the support region and the securing region fees the electrical mating plug connector, and the support region is opposite the front-end portion along the longitudinal axis (L) of the plug connector housing when the securing element is inserted into the plug connector housing, and the securing element is displaceable between a pre-latching position and a securing position, and the securing element blocks the locking securement means in the securing position to prevent unlocking of the electrical plug connector from the electrical mating plug connector; and the securing element is positioned in the pre-latching position, in the plug connector housing, in such a way that the securing element is mechanically tensioned by insertion of the electrical mating plug connector into a pre-securing position and wherein the guide defined in the plug connector housing guides displacement of the securing element from the pre-securing position into the securing position which releases the mechanical tension; and wherein the plug connector housing guide, guides the support region of the securing element in such a way that the support region performs a radial movement in the direction of the longitudinal axis (L) of the plug connector housing during axial displacement of the securing element from the pre-securing position into the securing position.

A further object of the present invention is an electrical connector wherein the mating plug connector has a detent hook which is designed to latch with the locking securement means of the electrical plug connector when the mating plug connector is inserted into the electrical plug connector, wherein the detent hook penetrates into the plug connector housing of the electrical plug during the insertion of the mating plug connectors, in such a way that the detent hook moves the securing element from the pre-latching position into the pre-securing position.

A still further obi of the present invention is an electrical plug connector wherein the at least one guide gin of the securing element is captively connected tote plug connector housing.

An even still further object of the present invention, is an electrical plug connector as claimed in Claim 16 and wherein the securing element has, at the front-end portion, at least one detent element which engages in a detent recess of the plug connector housing to latch the securing element in the securing position.

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalents.

The invention claimed is:

1. An electrical plug connector comprising:

a plug connector housing, that defines a feed for a securing element and a longitudinal axis (L);

a locking securement means carried on the plug connector housing for locking the electrical plug connector to a corresponding electrical mating plug connector; and wherein the securing element is displaceable between a pre-latching position and a securing position, and wherein the securing element blocks the locking securement means in the securing position to prevent unlocking of the electrical plug connector from the corresponding electrical mating plug connector; and wherein the securing element is displaceable along the feed defined by the plug connector housing starting from outside the plug connector housing in a direction towards the longitudinal axis (L) of the plug connector housing into the pre-latching position, and wherein the securing element has at least one guide pin which is engageable with the feed of the plug connector housing for displacing the securing element into the pre-latching position so as to guide the securing element during the displacement into the pre-latching position, and wherein the feed of the plug connector housing is a guide groove on an inner face of a side wall of the plug connector housing.

2. The electrical plug connector as claimed in claim 1, and wherein a displacement path for the securing element ends when the securing element is in the securing position, and whereat the securing element is between a detent portion of the locking securement means and an outer wall of the plug connector housing to block the locking securement means.

3. The electrical plug connector as claimed in claim 1 and wherein the feed is formed in the plug connector housing in such a way that the securing element is displaceable into the pre-latching position by a movement running substantially orthogonally to the longitudinal axis (L) of the plug connector housing.

4. The electrical plug connector as claimed in claim 1 and wherein the securing element is spaced from the corresponding electrical mating plug connector in the securing position.

5. The electrical plug connector as claimed in claim 1 and wherein the at least one guide pin of the securing element is engaged with a side guide of the plug connector housing for displacing the securing element from the pre-securing position into the securing position in order to guide the securing element during the displacement into the securing position.

6. The electrical plug connector as claimed in claim 1 and wherein the securing element is formed in one part.

7. The electrical plug connector as claimed in claim 1 and wherein the at least one guide pin of the securing element is captively connected to the plug connector housing.

8. An electrical plug connection comprising:

an electrical plug connector; and an electrical mating plug connector corresponding to the electrical plug connector; and wherein the electrical plug connector has a plug connector housing, a locking securement means for locking the electrical plug connector to the electrical mating plug connector, and a securing element which is displaceable between a pre-latching position and a securing position, whereat the securing element blocks the locking securement means in the securing position to prevent unlocking the electrical mating plug connector from the electrical plug connector; and wherein the plug connector housing forms a feed along which the securing element is displaceable into the pre-latching position starting from outside the plug connector housing in a direction towards the longitudinal axis (L) of the plug connector housing, and wherein the securing element has at least one guide pin which is engageable with the plug connector housing feed for displacing the securing element into the pre-latching position in order to guide the securing element during the displacement into the pre-latching position, and wherein the plug connector housing feed is in the form of one or more guide grooves which extend on an inner face of a side wall of the plug connector housing.

9. An electrical plug connector comprising:

a plug connector housing, that defines a guide for guiding movement of a securing element, and a longitudinal axis (L);

a locking securement means carried on the plug connector housing for locking the electrical plug connector to a corresponding electrical mating plug connector; and the securing element has a securing region at a front end portion, a support region at a rear end portion, and a spring region between the securing region and the support region, and the securing region faces the corresponding electrical mating plug connector, and the support region is opposite the front end portion along the longitudinal axis (L) of the plug connector housing when the securing element is inserted into the plug connector housing, and the securing element is displaceable between a pre-latching position and a securing position, and the securing element blocks the locking securement means in the securing position to prevent unlocking of the electrical plug connector from the corresponding electrical mating plug connector; and the securing element is positioned in the pre-latching position, in the plug connector housing, in such a way that the securing element is mechanically tensioned by insertion of the corresponding electrical mating plug connector into a pre-securing position, and wherein the guide defined in the plug connector housing guides displacement of the securing element from the pre-securing position into the securing position which releases the mechanical tension; and wherein the plug connector housing guide, guides the support region of the securing element in such a way that the support region performs a radial movement in the direction of the longitudinal axis (L) of the plug connector housing during axial displacement of the securing element from the pre-securing position into the securing position.

10. The electrical plug connector as claimed in claim 9 and wherein the securing element is positioned in the pre-latching position in the plug connector housing in such a way that insertion of the corresponding electrical mating plug connector into the electrical plug connector leads to a displacement of the securing region of the securing element running substantially orthogonally to the longitudinal axis (L), while the securing element is supported with the support region on the plug connector housing in such a way that the spring region in-between is mechanically braced.

11. The electrical plug connector as claimed in claim 9 and wherein the securing region, of the securing element, when in the pre-latching position is positioned in a recess in the locking securement means in such a way that the securing region is in a displacement path of a detent hook of the corresponding electrical mating plug connector in order to be displaced by the detent hook into the pre-securing position during insertion of the corresponding electrical mating plug connector into the electrical plug connector.

12. The electrical plug connector as claimed in claim 9 and wherein the securing element has, at the front end portion, at least one detent element which is engaged with a lateral guide of the plug connector housing for displacing the securing element from the pre-latching position into the pre-securing position in order to guide the securing element during the displacement into the pre-securing position.

13. The electrical plug connector as claimed in claim 9 and wherein the guide of the plug connector housing is designed to guide the support region of the securing element in such a way that the support region performs a radial movement in the direction of the longitudinal axis (L) of the plug connector housing during axial displacement of the securing element from the pre-securing position into the securing position.

14. The electrical plug connector as claimed in claim 9 and wherein the securing element is formed in one part.

15. The electrical plug connector as claimed in claim 9 and wherein the securing element has, at the front-end portion, at least one detent element which engages in a detent recess of the plug connector housing to latch the securing element in the securing position.

16. An electrical plug connection comprising:

an electrical plug connector; and an electrical mating plug connector corresponding to the electrical plug connector; and wherein the electrical plug connector has a plug connector housing, a locking securement means for locking the electrical plug connector to the electrical mating plug connector, and a securing element which is displaceable between a pre-latching position and a securing position, whereat the securing element blocks the locking securement means in the securing position to prevent unlocking the electrical mating plug connector from the electrical plug connector; and wherein the securing element has a securing region at a front-end portion, a support region at a rear end portion, and a spring region between the securing region and the support region, and the securing region faces the electrical mating plug connector, and the support region is opposite the front-end portion along the longitudinal axis (L) of the plug connector housing when the securing element is inserted into the plug connector housing, and the securing element is displaceable between a pre-latching position and a securing position, and the securing element blocks the locking securement means in the securing position to prevent unlocking of the electrical plug connector from the electrical mating plug connector; and the securing element is positioned in the pre-latching position, in the plug connector housing, in such a way that the securing element is mechanically tensioned by insertion of the electrical mating plug connector into a pre-securing position, and wherein the guide defined in the plug connector housing guides displacement of the securing element from the pre-securing position into the securing position which releases the mechanical tension, and wherein the plug connector housing guide, guides the support region of the securing element in such a way that the support region performs a radial movement in the direction of the longitudinal axis (L) of the plug connector housing during axial displacement of the securing element from the pre-securing position into the securing position.

17. The electrical plug connection as claimed in claim 16, and wherein the mating plug connector has a detent hook which is designed to latch with the locking securement means of the electrical plug connector when the mating plug connector is inserted into the electrical plug connector, wherein the detent hook penetrates into the plug connector housing of the electrical plug connector during the insertion of the mating plug connector, in such a way that the detent hook moves the securing element from the pre-latching position into the pre-securing position.

* * * * *